Figure 1:
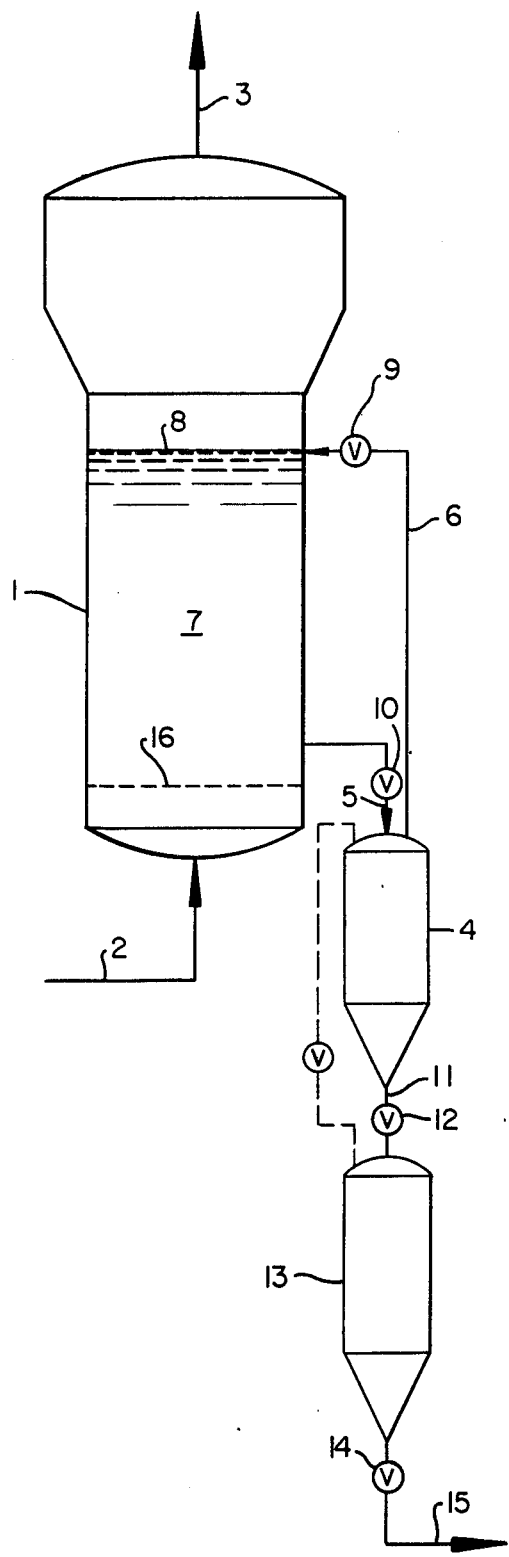

United States Patent [19]

Aronson

[11] Patent Number: 4,621,952
[45] Date of Patent: Nov. 11, 1986

[54] FLUIDIZED BED DISCHARGE PROCESS

[75] Inventor: Robert G. Aronson, S. Charleston, W. Va.

[73] Assignee: Union Carbide Corporation, Danbury, Conn.

[21] Appl. No.: 596,366

[22] Filed: Apr. 3, 1984

Related U.S. Application Data

[63] Continuation-in-part of Ser. No. 287,815, Jul. 28, 1981, abandoned.

[51] Int. Cl.$^4$ ............................................. B65G 53/16
[52] U.S. Cl. ...................................... 406/138; 406/124
[58] Field of Search ................ 406/138, 146, 124–126; 34/10, 57; 110/245; 431/7; 122/4 D; 414/217, 221; 48/DIG. 4

[56] References Cited

U.S. PATENT DOCUMENTS

| | | | |
|---|---|---|---|
| 1,935,843 | 11/1933 | Goebels | 406/16 |
| 2,077,898 | 4/1937 | Rolff | 406/16 |
| 2,641,335 | 6/1953 | Berg . | |
| 2,672,245 | 3/1954 | Dumermuth | 414/217 X |
| 2,703,654 | 3/1955 | Overton | 414/217 X |
| 2,985,324 | 5/1961 | Balentine | 414/217 X |
| 3,115,370 | 12/1963 | Cross, Jr. . | |
| 3,179,471 | 4/1965 | Savage | 414/217 X |
| 3,190,509 | 6/1965 | Kirchhoefer | 222/450 |
| 3,230,016 | 1/1966 | Gilbert et al. | 406/124 |
| 3,232,494 | 2/1966 | Poarch | 222/193 |
| 3,315,824 | 4/1967 | Kirchhoefer | 414/217 |
| 3,511,616 | 5/1970 | Steerer . | |
| 3,947,071 | 3/1976 | Wightman | 406/16 X |
| 3,994,701 | 11/1976 | Schweimanns | 406/12 X |
| 3,994,702 | 11/1976 | Schweimanns | 48/197 R |
| 4,003,712 | 1/1977 | Miller | 23/288 |
| 4,032,391 | 6/1977 | Moked et al. | 159/47 |
| 4,089,429 | 5/1978 | Stock et al. | 414/217 X |
| 4,099,933 | 7/1978 | Johnson et al. | 48/DIG. 4 |
| 4,108,500 | 8/1978 | Stamer | 406/12 |
| 4,255,542 | 3/1981 | Brown et al. | 526/88 |
| 4,334,893 | 6/1982 | Lang | 48/210 |

*Primary Examiner*—Jeffrey V. Nase
*Assistant Examiner*—L. E. Williams
*Attorney, Agent, or Firm*—Clement J. Vicari

[57] ABSTRACT

A fluidized bed discharge process for transferring solid particulate material from a high pressure vessel to lower pressure through successive zones of settling and transferring is disclosed, wherein said solid is maintained in a fluidized condition by the passage of a gas stream through said high pressure vessel from the base of said bed to the top of said vessel, involving conveying fluidized solid particulate material, by positive gas transfer, from a point in said vessel below the top of said bed, through the actuation of suitable valving means, to a settling zone or zones wherein said solid materials is separated from said gas which is vented back directly or indirectly into said vessel at a point above the point of conveying; upon the completion of conveying of said solid particulate material to said settling zone, actuating associated valving means to arrest all solid and gas flow to and from said settling zone; and actuating valve means associated with said settling zone to successively convey said solid particulate material from said settling zone to said convey zone or convey the gas from one said settling zone to a second settling zone.

7 Claims, 2 Drawing Figures

FLUIDIZED BED DISCHARGE PROCESS

This application is a continuation-in-part of Ser. No. 287,815, filed July 28, 1981, now abandoned.

The present invention relates to a fluidized bed discharge process and, more particularly, to such a process having the capability of discharging solid particulate material from a high pressure vessel to lower pressure, wherein separation of the solid from the fluidizing gas is effected and the loss of fluidizing gas from the fluidized bed is minimized.

The Union Carbide process for the manufacture of polyolefin resins involves the polymerization of olefin monomers in a fluidized bed reactor. Such prior Union Carbide process for the manufacture of polyolefin resins is disclosed in U.S. Pat. Nos. 4,003,712, 4,032,391, 4,255,542 and 4,302,565. As therein defined, polyolefin resin is discharged from the reaction zone through a gas lock zone and the unreacted monomer that accompanies the resin is vented and recycled back to the reaction zone by compression. The polyolefin resin product is then transferred to downstream equipment after a conventional dilute phase conveying system.

A study was initiated to find an alternative product discharge system because of the high investment, high operating cost and complexity associated with the prior gas lock zone process. The novel fluid bed discharge process of the present invention is an outcome of this study.

The overall result is a major reduction in investment, operating cost, and complexity for the manufacture of polyolefin resin using the new fluid bed discharge process in conjunction with the Union Carbide process for the manufacturing of polyolefin resins employing a fluidized bed reactor. Similar results are achievable for other fluidized bed discharge applications.

In accordance with the present invention, a fluidized bed discharge process for transferring solid particulate material from a high pressure vessel to lower pressure through successive zones of settling and transferring is provided, wherein said solid is maintained in a fluidized condition by the passage of a gas stream through said high pressure vessel from the base of said bed to the top of said vessel, comprising: conveying fluidized solid particulate material, by positive gas transfer, from a point in said vessel below the top of said bed, through the actuation of suitable valving means, to a settling zone or zones wherein said solid material is separated from said gas which is vented back directly or indirectly into said vessel at a point above the point of conveying; upon the completion of conveying of solid particulate material to said settling zone, actuating associated valving means to arrest all solid and gas flow to and from said settling zone; and actuating valve means associated with said settling zone to convey said solid particulate material from said settling zone to said transfer zone or convey the gas from one said settling zone to a second settling zone.

In the preferred embodiments, solids are intermittently discharged from a fluidized bed using a process that employs a vented settling zone and transfer zone. The vented settling zone serves to receive and separate solids and gas discharged from the fluid bed. After the zone is filled, the solids are transported to a transfer zone. The settling zone pressure equalizes with the transfer zone pressure at an intermediate pressure. After the transfer zone is isolated from the settling zone, the transfer zone pressure decreases from the intermediate pressure to approximately atmospheric pressure during solids transfer to downstream processing equipment. During the next fluidized bed discharge, the settling zone pressure increases from the intermediate pressure to the fluidized bed pressure. Prior to receipt of solids, the vented settling zone is empty and at the intermediate pressure. The transfer zone is empty and at approximately atmospheric pressure prior to receipt of solids.

IN THE DRAWINGS

Figure 2:
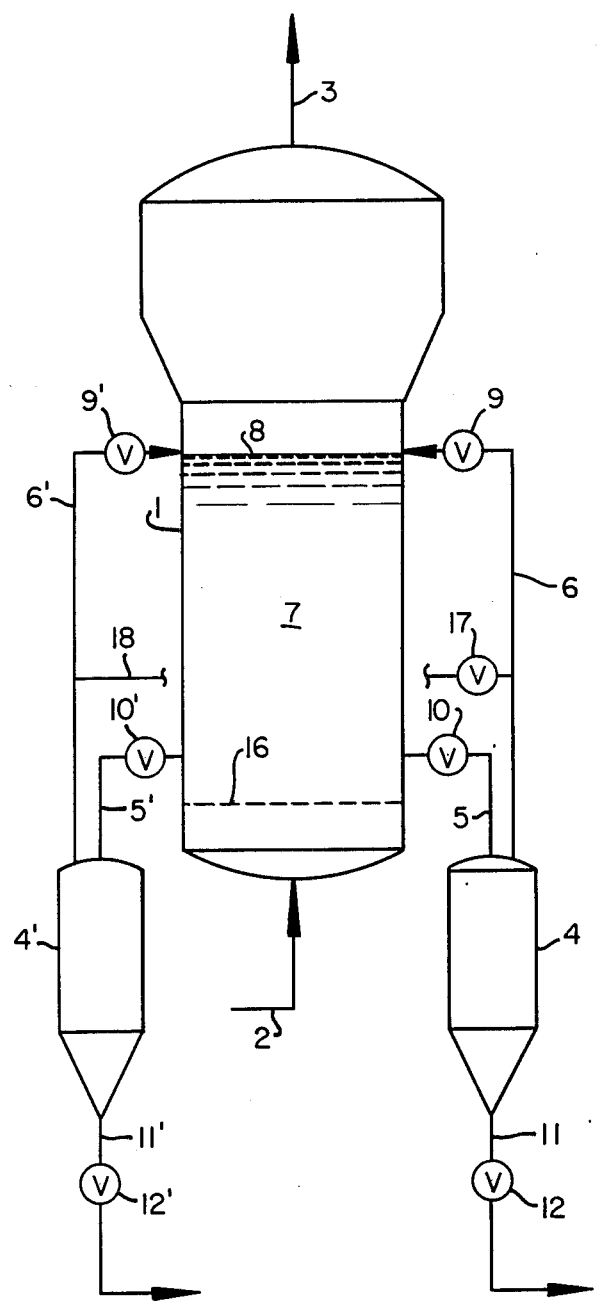

FIG. 1 is a simplified schematic view of apparatus suitable for the practice of the fluidized bed discharge process of the invention; and FIG. 2 is a simplified schematic view of alternate embodiment of apparatus suitable for practicing the fluid bed discharge process of the invention.

Referring to FIG. 1 of the drawings, one embodiment of system for carrying out the process of the invention is shown. The reaction vessel 1 contains a solid fluidized bed 7 with a gas stream entering inlet line 2 and leaving vent line at the top 3. A vented settling tank 4, located externally and preferably below the fluidized bed 7, is connected to the bed by a solid discharge line 5 and a vent line 6. The vent line 6 is directly connected to the reaction vessel 1 near the top level of fluidized solids 8 and the solids discharge line 5 is connected to the lower part of vessel 1 preferably near the distributor plate 16. A transfer tank 13 is located below and is connected to the bottom of the settling tank 4 by line 11 and is connected to downstream processing equipment through line 15. Initially vessel 1 and setting tank 4 and transfer tank 13 are isolated from each other and from downstream equipment by valves 9, 10, 12 and 14. Solids and gas are discharged from vessel 1 into the settling tank 4 by opening flow and vent line valves 10 and 9, while keeping settling tank outlet valve 12 closed. The settling tank pressure initially increases to approximately that at the bottom of vessel 1 and then the differential pressure across the fluidized bed of solids 7 is the driving force for solids and gas flow through the discharge line 5. This differential pressure is produced by the pressure drop across the bed of solids in vessel 1 by passage of the fluidizing gas stream from the inlet stream 2 to the outlet stream 3. A portion of this fluidizing gas and solids flows through line 5 and line 6 because of the lower resistance flow path compared to the flow path through the fluidized bed of solids. The solids and gas separate in the settling tank 4 and the gas is returned to vessel 1 through line 6 by displacement with additional solids and gas entering the settling tank 4. After the settling tank 4 fills with settled solids and some gas, the settling tank 4 is isolated from vessel 1 by closing the discharge and vent line valves 9 and 10. The solids are then transferred predominantly by pressure differential followed by gravity flow from the settling tank 4 to the transfer tank 13 through line 11 by opening valve 12. With the solids in the transfer tank 13 and the tank pressures equalized, valve 12 is closed. The settling tank 4 is now ready to start another discharge cycle or it can wait until the transfer tank 13 is finished transferring the solids to downstream equipment. The solids are then transported from the transfer tank 13 to downstream equipment at lower pressure by opening outlet valve 14. Solid transfer can be by conventional solids handling equipment or by high pressure conveying using the pressurized gas that is entrained with the solids (and additional gas, if required). After the solids are transported from the transfer tank 13, the outlet valve 14 is closed and the transfer tank is ready for another cycle.

Settling tank size is a function of the desired solids discharge rate and batch cycle time. The transfer tank is approximately equal in size to the settling tank. Excessive transfer tank volume will result in unnecessary gas losses from the fluidized bed system.

Accordingly, the invention provides an improved method for discharging solids from a fluidized bed while limiting the quantity of gas accompanying the solids. By limiting the gas leaving the fluidized bed, equipment required to recycle the entrained gas leaving with the solids can be reduced in size or eliminated. Limiting the gas leaving the fluidized bed is attributed to: filling the vented settling tank with settled solids, and then isolating the solids from most of the gas.

The vented settling tank and transfer tank concept lends itself to high pressure conveying of solids to downstream processing equipment, simplifying the process of transferring solids away from the fluid bed system.

The principles or methods of operation associated with the fluid bed discharge process of the invention may be altered and extended without losing the advantages of the invention by:

A. The solid discharge line that connects the vented settling tank and fluidized bed can be connected to the bottom of the fluidized bed instead of the side;

B. A vent line may be connected between the settling tank and the transfer tank to enhance displacement of gas by solids entering the transfer tank (see dotted line of FIG. 1);

C. Instead of transferring the solids from the settling tank to the transfer tank, two settling tanks operated in parallel and alternating sequentially, can be used where the gas is transferred between the tanks to reduce the entrained gas (see FIG. 2 embodiment); and D. Any number of transfer tank(s) and/or settling tank(s) can be connected in series or parallel or combination thereof. Each additional tank used to reduce the pressure of the gas remaining with the solids further reduces the quantity of gas leaving the system with the solids.

An alternate embodiment of apparatus for carrying out the process of the invention is shown schematically in FIG. 2 of the drawings. Solids are intermittently discharged from a high pressure vessel containing a fluidized bed of solids using a process that employs two of the basic vented tanks and transfer tank systems operated in parallel and settling alternated sequentially with gas vented from the solids prior to discharging the solids to a lower pressure. A first vented settling tank serves to receive solids and gas discharged from the fluid bed. After the tank fills with solids, some of the gas entrained with the solids is vented to the second parallel settling tank which serves as a temporary gas receiver later indirectly venting to the reaction vessel. The solids are then transferred from the first settling tank to a lower pressure while minimizing gas losses. The discharge operation is continued, alternating between the parallel settling tanks in receiving a solids and gas stream from the fluidized bed.

FIG. 2 of the drawings shows a vessel 1 which contains a solid fluidized 7 with a gas stream entering through line 2 and leaving through line 3. Two vented settling tanks 4,4', located externally of, and preferably below, the fluidized bed 7, are connected to the bed by solid discharge lines 5,5' and vent lines 6,6'. The vent lines 6,6' are connected to vessel 1 near the level of fluidized solids 8 and the solids discharge lines 5,5' are connected to the lower part of vessel 1 preferably near the distributor plate 16. A gas transfer line 18 connects the two settling tanks 4,4'. Initially vessel 1 and tanks 4 and 4' are isolated from each other and from downstream equipment by vales 9,9', 10,10', 12,12' and 17. Solids and gas are discharged from vessel 1 into one of the settling tanks, say 4, by opening valves 9 and 10 while keeping valve 12 closed. The settling tank pressure initially increases to that of vessel 1 and then the differential pressure across the fluidized bed of solids 7 is the driving force for solids and gas flow through line 5. The solids and gas separate in the settling tank 4 and the gas is returned to vessel 1 through line 6, by displacement with additional solids and gas entering the settling tank 4. After the settling tank 4 fills with settled solids and some gas, the settling tank 4 is isolated from vessel 1 by closing valves 9 and 10. Then some of the gas in tank 4 is transferred from the settling tank 4 to the parallel settling tank 4' through line 18 by opening valve 17. With the gas transferred to tank 4' and the tank pressure equalized, valve 17 is closed. The settling tank 4' is now ready to start another discharge cycle or it can wait until the settling tank 4 is finished transferring the solids to downstream equipment. The solids are transported from the settling tank 4 to lower pressure downstream equipment by opening valve 12. Solid transfer can be effected by conventional solids handling equipment or by high pressure conveying using the pressurized gas that is entrained with the solids (and additional gas, if required). After the solids are transported from the settling tank 4, valve 12 is closed and the settling tank 4 is ready for another cycle. The sequential discharge of solids from vessel 1 may be continued by alternating between 4 and 4' as the lead tank.

In the practice of the process of the invention in conjunction with the Union Carbide process for the polymerization of olefins, the polymerization reaction takes place in a fluidized bed reactor that operates at about 300 psig and at temperatures of between 80° C. and 110° C. Product flows intermittently from the reactor to the discharge process at high instantaneous rates. Depending on production rate, approximately 20 to 30 discharges are taken an hour. The discharge process cycle time (i.e., the time required to receive, handle, and transfer the product) is approximately 1.5 to 2.5 minutes depending on product properties, installation, and reactor size. Settled resin fills the settling tank to about 90% of the tank volume. Resin discharge rate from the reactor to the settling tank is on the order of 200,000–300,000 lb/hr which is a function of several, if not many, process variables. The high solids discharge rate is due mainly to the high gas flow rate through the discharge line, settling tank, and vent line created by the lower resistance flow path compared to the flow path through the fluidized bed of solids. The settling tank normally operates from about 100 psig to 300 psig. The transfer tank normally operates from about 0 psig to 110 psig and as high as 150 psig. Settling tank volume is a function of production rate.

It is believed that the high solids reactor discharge rates attainable in accordance with the "positive gas transfer" of the present invention (as contrasted with simple gravity feed systems of the prior art) is due to the positive pressure differential ($\Delta P$) produced by the pressure drop across the fluidized bed of the reactor (from inlet to outlet) by the passage of the fluidizing bed gas stream therethrough. For example, in an embodiment of the process of the invention wherein the fluidized bed inlet pressure is 305 psig and the outlet pressure is 300 psig, a ΔP of 5 psig across a 8-inch diameter discharge line (see 5 of FIG. 1) is capable of producing the 200,000–300,000 lb/hr resin discharge rate to the settling zone referred to above. It is in this sense that the term "positive gas" transfer is employed herein and describes a result which is an order of magnitude exceeding the capabilities of prior art gravity transfer process, even when only relatives low ΔP is employed.

What is claimed is:

1. A fluidized bed discharge process for transferring solid particulate material from a high pressure vessel to lower pressure through successive zones of settling and transferring, wherein said solid is maintained in a fluidized condition by the passage of a gas stream through a distributor plate in said high pressure vessel from the base of said bed to the top of said vessel, comprising: conveying fluidized solid particulate material, by positive gas transfer, from a point in said vessel below the top of said bed and above said distributor plate, through the actuation of suitable valving means, to a settling zone or zones wherein said solid material is separated from said gas which is vented back directly and indirectly into said vessel at a point above the point of conveying; upon the completion of conveying of said solid particulate material to said settling zone, actuating associated valving means to arrest all solid and gas flow to and from said settling zone; and actuating valve means associated with said settling zone to a transfer solid particulate material from said settling zone to a transfer zone or convey the gas from one said settling zone to a second settling zone.

2. The solid fluidized bed discharge process in accordance with claim 1, wherein said upper portions of said settling zone and said transfer zone may be pressure equalized by providing connecting conduit means.

3. A fluidized bed discharge process for transferring solid particulate material from a high pressure vessel to lower pressure through successive zones of settling and transferring, wherein said solid is maintained in a fluidized condition by the passage of a gas stream through said high pressure vessel from the base of said bed to the top of said vessel, comprising the steps of:
   (a) conveying fluidized solid particulate material, by positive gas transfer, from a point in said vessel below the top of said bed, through the actuation of suitable valving means, to a settling zone wherein said solid material is separated from said gas which is vented back into said vessel at a point above the point of conveying;
   (b) Upon the completion of conveying of solid particulate material to said settling zone, actuating associated valving means to arrest all solid and gas flow to and from said settling zone;
   (c) actuating valve means associated with said settling zone to transfer the solid particulate from said settling zone to said transfer zone of convey the gas from one said settling zone to a second settling zone;
   (d) upon the completion of conveying of solid material to said transfer zone or conveying of gas to said second settling zone, actuating associated valve means to arrest all solid and gas flow to and from said transfer zone or said second settling zone; and
   (e) actuating valve means associated with either said transfer zone or said first settling zone to discharge solid material from either said transfer zone or said first settling zone, as the case may be, whereby solid material transfer is effected while minimizing gas losses.

4. The solid fluidized bed discharge process in accordance with claim 3, wherein said upper portions of said settling zone and said transfer zone may be pressure equalized by providing connecting conduit means.

5. A fluidized bed discharge process for conveying solid particulate material from a high pressure vessel to lower pressure through successive zones of settling and conveying, wherein said solid is maintained in a fluidized condition by the passage of a gas stream through a distributor plate said high pressure vessel from the base of said bed to the top of said vessel, comprising the steps of:
   (a) conveying fluidized solid particulate material, by positive gas transfer, from a point in said vessel below the top of said bed, through the actuation of suitable valving means, to a settling zone wherein said solid material is separated from said gas which is vented back into said vessel at a point above the point of conveying;
   (b) upon the completion of conveying of said solid particulate material to said settling zone, actuating associated valving means to arrest all solid and gas flow to and from a settling zone;
   (c) actuating valve means associated with said settling zone to transfer the solid particulate from said settling zone to said transfer zone;
   (d) upon the completion of conveying of solid material to said transfer zone, actuating associated valve means to arrest all solid and gas flow to and from said transfer zone; and
   (e) actuating valve means associated with said transfer zone to discharge solid material from said transfer zone, whereby solid material transfer is effected while minimizing gas losses.

6. The solid fluidized bed discharge process in accordance with claim 5, wherein said upper portions of said settling zone and said transfer zone may be pressure equalized by providing connecting conduit means.

7. A fluidized bed discharge process for transferring solid particulate material from a high pressure vessel to lower pressure through successive zones of settling and transfer, wherein said solid is maintained in a fluidized condition by the passage of a gas stream through a distributor plate in said high pressure vessel from the base of said bed to the top of said vessel, comprising the steps of:
   (a) conveying fluidized solid particulate material, by positive gas transfer, from a point in said vessel below the top of said bed and above said distributor plate, through the actuation of suitable valving means, to a settling zone wherein said solid material is separated from said gas which is vented back into said vessel at a point above the point of conveying;
   (b) upon the completion of conveying of said solid particulate material to said settling zone, actuating associated valving means to arrest all solid and gas flow to and from said settling zone;
   (c) actuating valve means associated with said settling zone to transfer the gas from one settling zone to a second settling zone;
   (d) upon completion of conveying said gas from one to said second settling zone, actuating associated valve means to arrest all solid and gas flow to and from said settling zones; and
   (e) actuating valve means associated with said one settling zone to discharge solid material from said one settling zone, whereby solid material transfer is effected while minimizing gas losses.

* * * * *